Aug. 31, 1965   J. W. AGER, JR., ETAL   3,203,979
REACTION PRODUCTS OF DECABORANES AND ACETYLENIC
ESTERS AND THEIR PREPARATION
Filed March 6, 1959
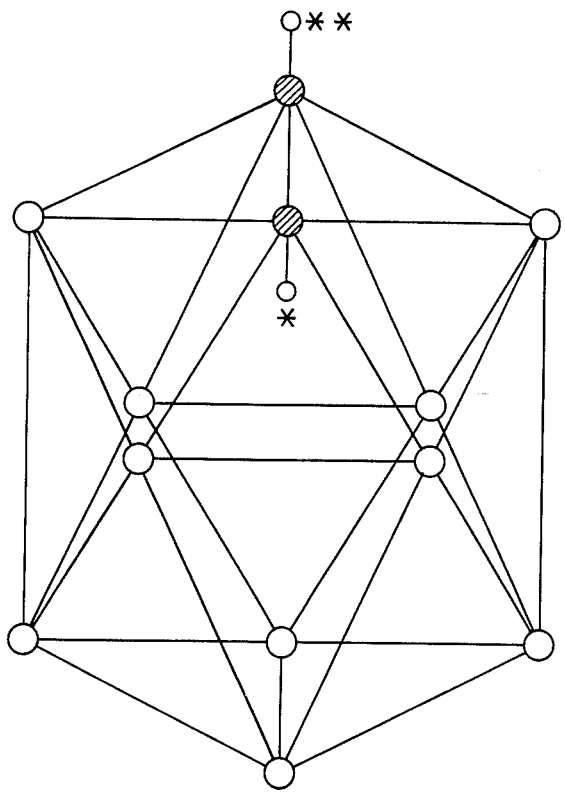
INVENTORS
JOHN W. AGER, JR.
THEODORE L. HEYING
BY
*Adams Forward and McLean*
ATTORNEYS

United States Patent Office 3,203,979
Patented Aug. 31, 1965

3,203,979
REACTION PRODUCTS OF DECABORANES AND ACETYLENIC ESTERS AND THEIR PREPARATION
John W. Ager, Jr., Buffalo, and Theodore L. Heying, Tonawanda, N.Y., assignors to Olin Mathieson Chemical Corporation, a corporation of Virginia
Filed Mar. 6, 1959, Ser. No. 797,809
18 Claims. (Cl. 260—488)

This invention relates to organoboron esters and to a method for their preparation. The organoboron esters are prepared by the reaction of decaborane or an alkylated decaborane having 1 to 2 alkyl groups containing 1 to 5 carbon atoms in each alkyl group with an acetylenic ester containing from four to twenty-two carbon atoms. The reaction products prepared by the method of this invention can be either liquid or solid and are useful as fuels.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, by Elmar R. Altwicker, Alfred B. Garrett, Samuel W. Harris and Earl A. Weilmuenster now Patent No. 2,999,-117.

The acetylenic esters useful in this invention can be prepared from readily available acetylenic alcohols and acetylenic diols according to procedures well known in the art. For example, carboxylic acid esters are produced by causing carboxylic acid anhydrides or halides to react with propynol-3 in the liquid phase in the presence of water, esters being formed which are easily separated from the aqueous reaction mixture and may be purified by distillation according to the method described in U.S. Patent No. 2,340,701 to Schlichting et al.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. The liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with this invention, it was discovered that decaborane or alkylated decaboranes having 1 to 2 alkyl groups containing 1 to 5 carbon atoms in each alkyl group will react with an ester of an acetylenic alcohol containing from three to ten carbon atoms in the presence of any of a wide variety of amines, ethers, nitriles or sulfides. Suitable acetylenic esters include those of a monocarboxylic acid having from 1 to 6 carbon atoms and an acetylenic monohydric or dihydric alcohol containing from 3 to 10 carbon atoms. The esters can be prepared from acids such as formic acid, acetic acid, propionic acid, n-butyric acid, valeric acid, benzoic acid, and the like, and alcohols such as propargyl alcohol, 3-butyn-1-ol, 3-butyn-2-ol, 1-pentyn-5-ol, 1-pentyn-4-ol, butyndiol-1,4; 2-hexyndiol-1,6; 3-hexyndiol-1,6; 1-octyn-8-ol, 1-decyn-10-ol, and the like. Examples of such esters include propargyl acetate, propargyl butyrate, 3-butyn-1-yl acetate, 3-butyn-2-yl acetate, 1-pentyn-5-yl acetate, 1-pentyn-4-yl propionate, butyndiyl-1,4 diacetate, butyndiyl-1,4 dibenzoate, 2-hexyndiyl-1,6 diacetate, 1-heptyn-7-yl valerate, 1-nonyn-9-yl propionate, and the like. Suitable amines include methylamine, ethylamine, n-propylamine, isopropylamine, 2-aminopentane, tert-amyl-amine, dimethylamine, diethylamine, di-n-propyl-amine, di-sec-butylamine, methylethylamine, trimethyl-amine, triethylamine, ethylenediamine, propylenediamine, 1,3-diaminobutane, hexamethylenediamine, and octamethylenediamine. Suitable ethers include dimethyl ether, diethyl ether, methyl ethyl ether, diisopropyl ether, di-n-propyl ether, ethyl n-butyl ether, ethylene glycol dimethyl ether, dioxane, and tetrahydrofuran. Suitable nitriles include hydrogen cyanide, acetonitrile, propionitrile, butyronitrile, isobutyronitrile, dimethyl propionitrile, valeronitrile, acrylonitrile, 3-butenenitrile, 4-pentenenitrile, succinonitrile, malononitrile, adiponitrile, and B,B'-oxydipropionitrile. Suitable sulfides include dimethyl sulfide, diethyl sulfide, ethyl methyl sulfide, diisopropyl sulfide, ethyl propyl sulfide, di-n-butyl sulfide and diphenyl sulfide.

The ratio of reactants can be varied widely, generally being in the range of 0.05 to 20 moles of acetylenic compound per mole of decaborane or alkyldecaborane and preferably in the range of 0.8 to 1.5 moles of acetylenic compound per mole of decaborane or alkyldecaborane. The ratio of amine, ether, nitrile, or sulfide to borane also can be varied widely, generally being in the range of 0.001 to 100 moles of amine, ether, nitrile, or sulfide per mole of decaborane or alkyldecaborane, and preferably being in the range of 0.05 to 20 moles of amine, ether, nitrile, or sulfide per mole of decaborane or alkyldecaborane. The reaction temperature can vary widely, generally being from 25° to 180° C. and preferably between 50° and 120° C. The reaction pressure can vary from subatmospheric to several atmospheres, i.e., from 0.2 to 20 atmospheres, although atmospheric pressure reactions are convenient. The degree of completeness of the reaction can be determined by the rate and quantity of hydrogen evolved, the rate at which solid products form and precipitate from solution, or by analysis of the reaction mixture. The reaction generally requires about 1 to 150 hours, depending upon the ratio of reactants, the particular reactants and solvents employed and the temperature and pressure of the reaction.

The reaction can or need not be conducted in a solvent common for the reactants but inert with respect to the reactants. Such solvents include hydrocarbon solvents such as n-pentane, hexane, and heptane, aromatic hydrocarbon solvents such as benzene, toluene, and xylene, and cycloaliphatic solvents such as cyclohexane and methylcyclohexane. The amount of solvent can vary widely but generally ranges up to about 50 times the weight of the reactants.

The process of the invention is illustrated in detail by the following examples. In the examples, the term "moles" signifies gram moles.

Example I

A mixture of 5 g. (0.041 mole) of decaborane, 8 g. (0.047 mole) of butyndiyl-1,4 diacetate and 2 ml. (0.0186 mole) of diethyl sulfide in 40 ml. (0.385 mole) of diethyl ether was placed in a 250 ml. autoclave and heated at 110° C. for 4½ hours. Ether was distilled from the reaction product and the residue was dissolved in about 200 ml. of pentane, filtered, and the pentane solution was cooled in Dry Ice. The cooled pentane solution was filtered and the solid that was collected weighed 10.5 g. and melted at about room temperature. Several crystallizations from pentane gave a colorless solid melting at 43 to 44° C. Mass spectrometric analysis indicated that the product was

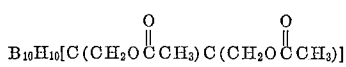

The product was found to contain 35.2 percent boron, compared with the calculated value of 37.5 percent.

Example II

To a 100 ml. one-neck flask equipped with a condenser closed with a calcium chloride tube, were charged 4.0 g. (0.0327 mole) of decaborane, 1.5 g. (0.037 mole) of acetonitrile, 30 ml. of benzene and 4.5 g. (0.0402 mole) of 3-butyn-1-yl acetate. The mixture was refluxed for 103 hours. The benzene was evaporated and 5.17 g. of white solid was distilled between 108 and 118° C. at 0.3 mm. of mercury absolute, a yield of 71.7 percent. This solid was found to have a melting point of 61 to 63° C. and it contained 32.1, 32.7 percent carbon and 7.9, 8.4 percent hydrogen. Mass spectrographic analysis showed the product to be

which is calculated to contain 31.2 percent carbon and 7.9 percent hydrogen.

Example III

A 100 ml. one-neck flask was equipped with a condenser closed with a calcium chloride tube. 4.0 g. (0.0327 mole) of decaborane, 4.5 g. (0.0402 mole) of 3-butyn-2-yl acetate, 1.5 g. (0.0366 mole) of acetonitrile and 30 ml. of benzene were charged to the reaction flask. The mixture was refluxed for 95 hours. The benzene was removed and the product was distilled between 85° C. at 0.15 mm. Hg absolute and 95° C. at 0.2 mm. Hg absolute. It was a yellow liquid and weighed 4.75 g., a 65.7 percent yield. The residue was a thermoplastic solid containing 39.0 percent boron. The liquid product had a refractive index at 21° C. of 1.5291 and was found to contain 33.3 percent carbon, and 7.81, 8.22 percent hydrogen. Mass spectrometric analysis indicated that the product,

which is calculated to contain 47.0 percent boron, 31.2 percent carbon and 7.9 percent hydrogen was present in both distillate and residue.

Example IV 3.25 g. (0.0266 mole) of decaborane, 1.2 g. (0.0133 mole) of diethylsulfide, and 20 ml. of dry dioxane were charged to a 15 ml. one-neck flask. The mixture was refluxed for one hour, 3.75 g. (0.0335 mole) of 3-butyn-2-yl acetate were added and refluxing was continued for 21 hours. The dioxane was removed and 1.86 g. of product were distilled. Mass spectrometric analysis indicated the product to be

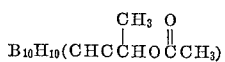

Example V

Propargyl acetate was prepared in a standard manner from propargyl alcohol and acetyl chloride in benzene.

2.0 g. (0.0164 mole) of decaborane were dissolved in 15 ml. of benzene and an equimolar quantity of acetonitrile was added along with 0.021 mole of propargyl acetate. The mixture was refluxed for two days; gas evolution was vigorous at first and then subsided. The resulting yellow solution was treated with trimethylamine to remove unreacted decaborane, but none was present. The solution was concentrated and the residue was distilled at 82 to 84° C. and a pressure of 0.2 mm. Hg absolute giving 2.1 g. (60.0 percent)

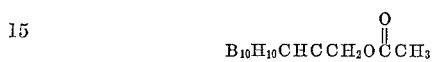

which on standing solidified to a white solid having a melting point of 42 to 43° C. This structure was verified by mass spectrometric analysis.

Repetition of this experiment resulted in an 83 percent yield of product.

The compound of the formula

prepared as described in Example 5 has the same structural formula as shown in the accompanying drawing with the exception that the hydrogen atom indicated by a single asterisk is replaced by the radical

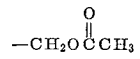

The compound of the formula

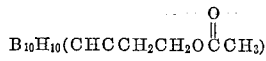

prepared as described in Example 2 has the same structural formula as shown in the accompanying drawing with the exception that the hydrogen atom indicated by a single asterisk is replaced by the radical

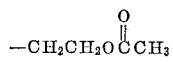

The compound of the formula

prepared as described in Examples 3 and 4 has the same structural formula as shown in the accompanying drawing with the exception that the hydrogen atom indicated by a single asterisk is replaced by the radical

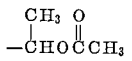

The compound of the formula

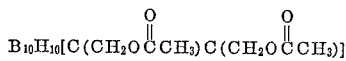

prepared as described in Example 1 has the same structural formula as shown in the accompanying drawing with the exception that the hydrogen atoms indicated by each of the single and double asterisk are replaced by the radical

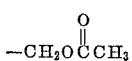

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artifical resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant composition, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a boro-hydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected, the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as air-craft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvement in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

It is claimed:

1. A method for the production of an organoboron compound useful as a fuel which comprises reacting with the formation of hydrogen a borane selected from the group consisting of decaborane and alkyl decaboranes having from one to two alkyl groups containing from one to five carbon atoms in each alkyl group with an acetylenic compound which is an ester of a monocarboxylic acid having from 1 to 6 carbon atoms and an acetylenic alcohol selected from the class consisting of monohydric alcohols and dihydric alcohols containing from 3 to 10 carbon atoms at a temperature within the range from 25° to 180° C. and at a pressure of from 0.2 to 20 atmospheres while the reactants are in admixture with a material selected from the group consisting of lower dialkyl ethers, dioxane, tetrahydrofuran, ethylene glycol dialkyl ethers, hydrogen cyanide, nitriles of the saturated and unsaturated aliphatic mono- and dicarboxylic acids containing 2 to 5 carbon atoms, B,B'-oxydipropionitrile, the lower alkyl, dialkyl and trialkyl amines, alkyl diamines containing 2 to 8 carbon atoms, lower dialkyl sulfides and diphenyl sulfide, the molar ratio of said borane to said acetylenic compound being within the range of 0.05:1 to 20:1 and the molar ratio of said material to said borane being within the range of from 0.001 to 100:1.

2. The method of claim 1 wherein said borane is decaborane.

3. The method of claim 1 wherein said acetylenic compound is propargyl acetate.

4. The method of claim 1 wherein said acetylenic compound is 3-butyn-1-yl acetate.

5. The method of claim 1 wherein said acetylenic compound is 3-butyn-2-yl acetate.

6. The method of claim 1 wherein said acetylenic compound is butyndiyl-1,4- diacetane.

7. The method of claim 1 wherein said material is diethyl sulfide.

8. The method of claim 1 wherein said material is acetonitrile.

9. The method of claim 1 wherein said borane is decaborane, wherein said acetylenic compound is propargyl-acetate, and wherein said material is acetonitrile.

10. The method of claim 1 wherein said borane is decaborane, wherein said acetylenic compound is 3-butyn-1-yl acetate, and wherein said material is acetonitrile.

11. The method of claim 1 wherein said borane is decaborane, wherein said acetylenic compound is 3-butyn-2-yl acetate, and wherein said material is acetonitrile.

12. The method of claim 1 wherein said borane is decaborane, wherein said acetylenic compound is butyndiyl-1,4 diacetate, and wherein said material is a mixture of diethyl sulfide and diethyl ether.

13. The method of claim 1 wherein said borane is decaborane, wherein said acetylenic compound is 2-butyn-2-yl acetate, and wherein said material is a mixture of diethyl sulfide and dioxane.

14. $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, an alkyl radical, and radicals of the class

wherein $R_1$ is a bivalent saturated hydrocarbon radical containing 1 to 8 carbon atoms at least one radical of the class

being present, and $R_2$ is selected from the class consisting of a benzyl radical and alkyl radicals containing 1 to 6 carbon atoms, the total number of carbon atoms in the $R_1$ radical portion of R'' and R''' taken together not exceeding eight.

15.
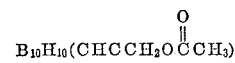

16.
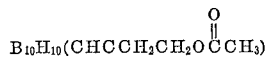

17.
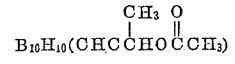

18.
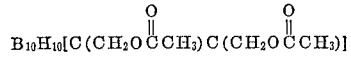

No references cited

LORRAINE A. WEINBERGER, *Primary Examiner.*

ROGER L. CAMPBELL, LEON D. ROSDOL, CARL D. QUARFORTH, *Examiners.*

UNITED STATES PATENT OFFICE
CERTIFICATE OF CORRECTION

Patent No. 3,203,979                                              August 31, 1965

John W. Ager et al.

It is hereby certified that error appears in the above numbered patent requiring correction and that the said Letters Patent should read as corrected below.

Column 8, lines 15 and 16, for "2-butyn-2-yl acetate" read -- 3-butyn-2-yl acetate --.

Signed and sealed this 7th day of June 1966.

(SEAL)
Attest:

ERNEST W. SWIDER
Attesting Officer

EDWARD J. BRENNER
Commissioner of Patents